(12) United States Patent
Konicek et al.

(10) Patent No.: US 10,372,150 B2
(45) Date of Patent: Aug. 6, 2019

(54) LOCKING MECHANISMS FOR RAM AIR TURBINE ACTUATORS

(71) Applicant: Hamilton Sundstrand Corporation, Charlotte, NC (US)

(72) Inventors: Timothy S. Konicek, Rockford, IL (US); Gary Sasscer, Leaf River, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 77 days.

(21) Appl. No.: 15/344,460

(22) Filed: Nov. 4, 2016

(65) Prior Publication Data

US 2018/0129242 A1    May 10, 2018

(51) Int. Cl.
*G05G 5/06* (2006.01)
*B64D 41/00* (2006.01)

(52) U.S. Cl.
CPC ............ *G05G 5/06* (2013.01); *B64D 41/007* (2013.01)

(58) Field of Classification Search
CPC ........ B64D 41/007; F16B 21/165; G05G 5/06
See application file for complete search history.

(56) References Cited

U.S. PATENT DOCUMENTS

| 3,302,960 A * | 2/1967 | Herrmann | F16B 21/165 285/277 |
|---|---|---|---|
| 6,560,910 B1 * | 5/2003 | McLaren | F41A 17/04 42/70.11 |
| 8,640,563 B2 * | 2/2014 | Lang | B64D 41/007 74/89.37 |

* cited by examiner

*Primary Examiner* — Thomas C Diaz
(74) *Attorney, Agent, or Firm* — Locke Lord LLP; Daniel J. Fiorello; Joshua L. Jones

(57) ABSTRACT

A locking mechanism for a ram air turbine actuator can include at least one of spherical locking pawls configured to retain an outer member and spherical pawl rollers configured to radially actuate the spherical locking pawls by axial movement of the spherical pawl rollers.

8 Claims, 4 Drawing Sheets

LOCKING MECHANISMS FOR RAM AIR TURBINE ACTUATORS

BACKGROUND

1. Field

The present disclosure relates to ram air turbine (RAT) actuators, more specifically to locking mechanisms for ram air turbine actuators.

2. Description of Related Art

Traditional locking elements (referred to as pawls) used on the ram air turbine (RAT) actuators are complex in shape (e.g., including rectangular pawl pockets), requiring sophisticated machining. The preferred method of forming the rectangular pawl pockets (referred to as windows) with the necessary precision and surface finish in the inner member is time consuming and costly. The geometry and surface finish of these windows and that of the mating pawls are very critical, and must be tightly controlled to ensure proper operation free from binding.

Such conventional methods and systems have generally been considered satisfactory for their intended purpose. However, there is still a need in the art for improved locking mechanisms for RAT actuators. The present disclosure provides a solution for this need.

SUMMARY

In accordance with at least one aspect of this disclosure, a ram air turbine actuator locking mechanism can include a first member including a plurality of pawl roller openings, a second member being axially movable relative to the first member at least between a locked position and an unlocked position, the second member including a plurality of locking pawl openings, and one or more pawl rollers disposed in each pawl roller opening such that the pawl rollers at least partially extend radially outward from a first outer surface of the first member. One or more locking pawls can be disposed in each locking pawl opening and configured to move radially relative to the second member between an extended position where the locking pawls at least partially extend radially outward of a second outer surface of the second member and a retracted position where the locking pawls do not extend radially outward of the second outer surface, the extended position coexisting with the locked position and the retracted position coexisting with the unlocked position. The pawl rollers, the locking pawls, the first member, and the second member can be shaped and configured such that axial movement in a first direction of the first member relative to the second member causes the pawl rollers to contact the locking pawls and to urge them radially outward toward the extended position thereby defining the locked position, at least one of the locking pawls or the pawl rollers being spherical. The mechanism can include a third member in operable communication with the second member, the third member being prevented from moving past the locking pawls in the locked position and being allowed to move past the locking pawls in the unlocked position.

In accordance with at least one aspect of this disclosure, a ram air turbine actuator locking mechanism includes a lock bolt including a plurality of pawl roller openings and an inner member disposed around the lock bolt, the inner member including a plurality of locking pawl openings. One or more pawl rollers are disposed in each pawl roller opening such that the pawl rollers at least partially extend radially outward from the locking bolt.

The mechanism includes one or more locking pawls disposed in each locking pawl opening and configured to move radially relative to the inner member between an extended position where the locking pawls at least partially protrude from an outer surface of the inner member and a retracted position where the locking pawls do not extend from the outer surface of the inner member. The locking pawls are shaped such that axial movement of the pawl rollers causes radial movement of the locking pawls when the pawl rollers contact the locking pawls. At least one of the locking pawls or the pawl rollers are spherical.

The lock bolt is configured to slidably move relative to the inner member between a locked position where the pawl rollers contact the locking pawls to push the locking pawls to the extended position, and an unlocked position where the locking pawls are in the retracted position. An outer member is disposed around the inner member and configured to slidably move relative to the inner member. The outer member is prevented from sliding past the locking pawls in the locked position and is allowed to slide past the locking pawls in the unlocked position.

In certain embodiments, each of the pawl rollers and each of the locking pawls can be spherical. In certain embodiments, the locking pawls can be smaller than the pawl rollers.

It is contemplated that any suitable number of pawl rollers or locking pawls can be spherical or any suitable combination of shapes. Similarly, the locking pawl openings and the pawl roller openings can have a cylindrical shape or any other suitable shape. In certain embodiments, there are two locking pawls for each pawl roller.

A ratio of size between the pawl rollers and the locking pawls can be selected to provide a predetermined rate of extension of the locking pawls as a function of axial movement of the pawl rollers. In certain embodiments, the pawl rollers can extend through the pawl roller openings and contact each other at a radially inward portion of the lock bolt.

The outer member can include a locking pawl contact face with a tapered edge. The tapered edge can be conformal to the locking pawls or any other suitable shape. The outer member can be biased against the locking pawls and thereby provide a radially inward retaining force through the tapered edge.

In accordance with at least one aspect of this disclosure, a locking mechanism for a ram air turbine actuator includes spherical locking pawls configured to retain an outer member, and spherical pawl rollers configured to radially actuate the spherical locking pawls by axial movement of the spherical pawl rollers. The locking pawls and pawl rollers can be as described herein.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
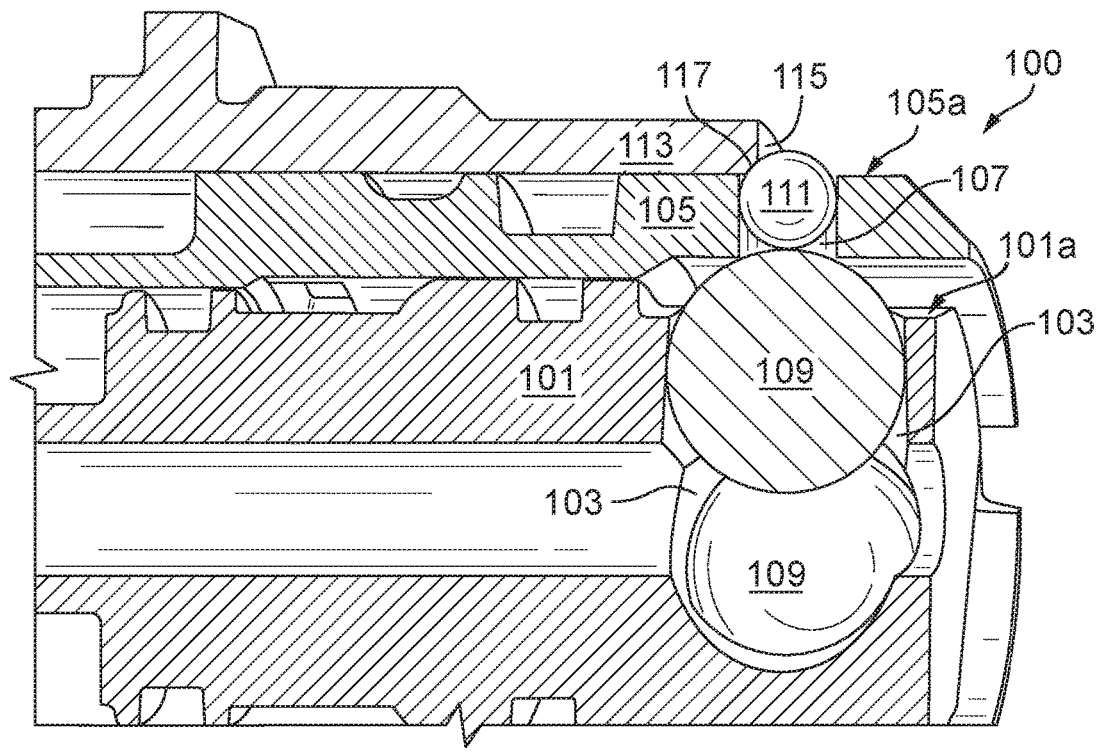
FIG. 1 is a partial cross-sectional view of an embodiment of a mechanism in accordance with this disclosure, shown in the locked position.
Figure 2:
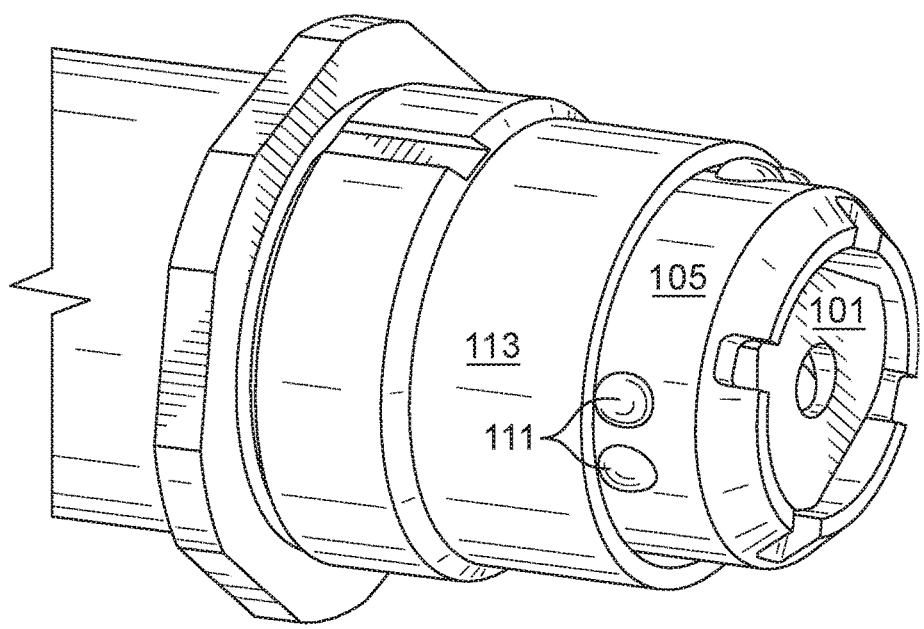
FIG. 2 is a perspective view of the embodiment of FIG. 1, shown in the locked position.
Figure 3:
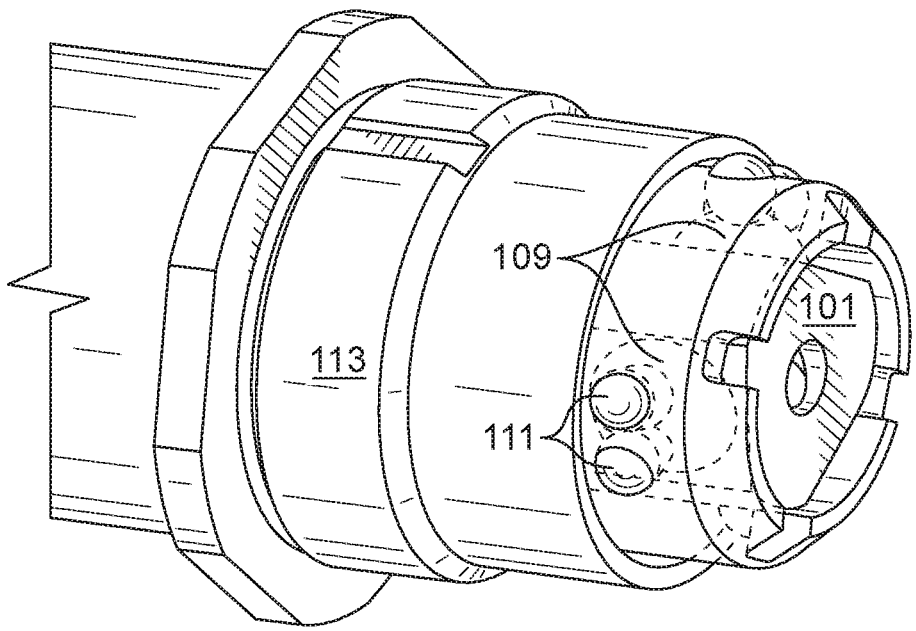
FIG. 3 is a perspective view of the embodiment of FIG. 1, shown having the inner member in phantom and shown in the locked position.
Figure 4:
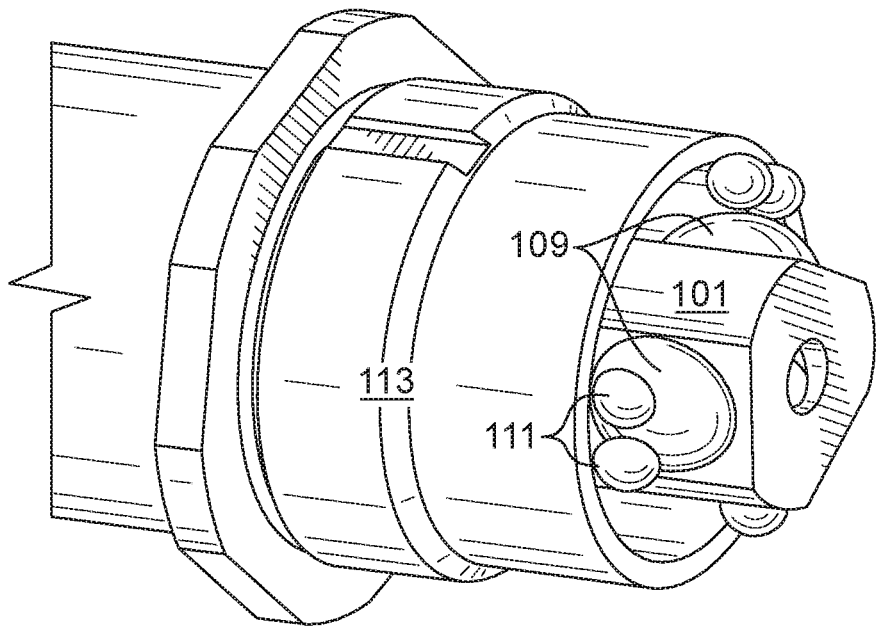
FIG. 4 is a perspective view of the embodiment of FIG. 1, shown having the inner member in removed for clarity and shown in the locked position.
Figure 5:
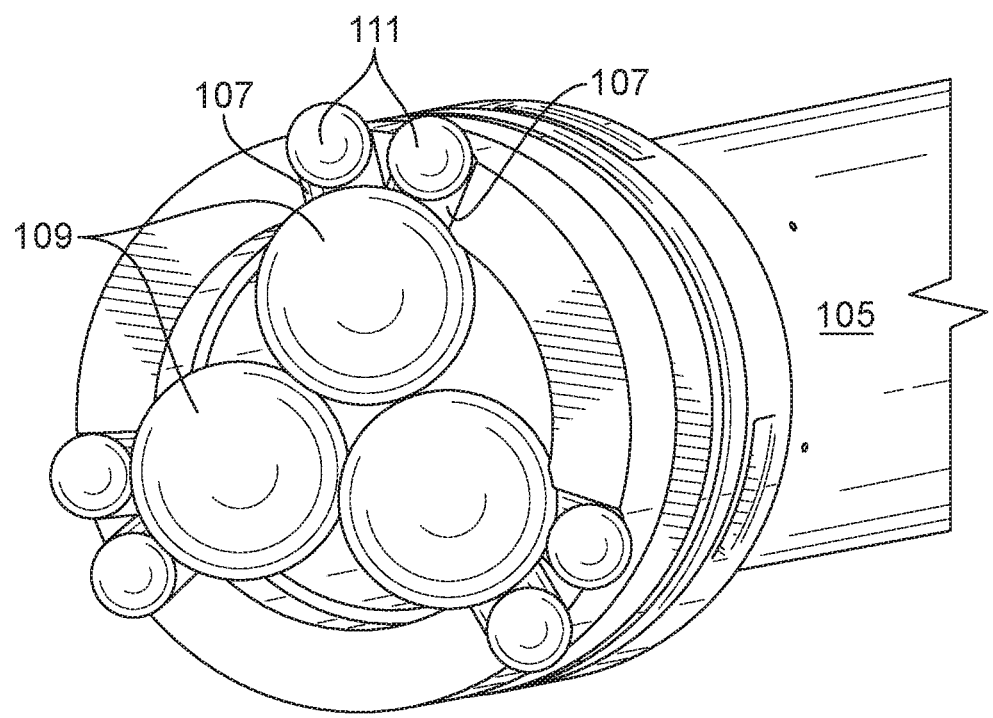
FIG. 5 is a perspective view of the embodiment of FIG. 1, shown having the outer member and the lock bold removed for clarity and shown in the locked position.

Reference will now be made to the drawings wherein like reference numerals identify similar structural features or aspects of the subject disclosure. For purposes of explanation and illustration, and not limitation, an illustrative view of an embodiment of a locking mechanism in accordance with the disclosure is shown in FIG. 1 and is designated generally by reference character 100. Other embodiments and/or aspects of this disclosure are shown in FIGS. 2-8. The systems and methods described herein can be used to provide simplified and reliable locking mechanisms for ram air turbine (RAT) actuators.

Referring to the embodiment of FIG. 1 and the various views thereof in FIGS. 2-8, a ram air turbine actuator locking mechanism 100 includes a lock bolt 101 including a plurality of pawl roller openings 103.

An inner member 105 is disposed around the lock bolt 101 and includes a plurality of locking pawl openings 107. One or more pawl rollers 109 are disposed in each pawl roller opening 103 such that the pawl rollers 109 at least partially extend radially outward from the locking bolt 101.

Figure 6:
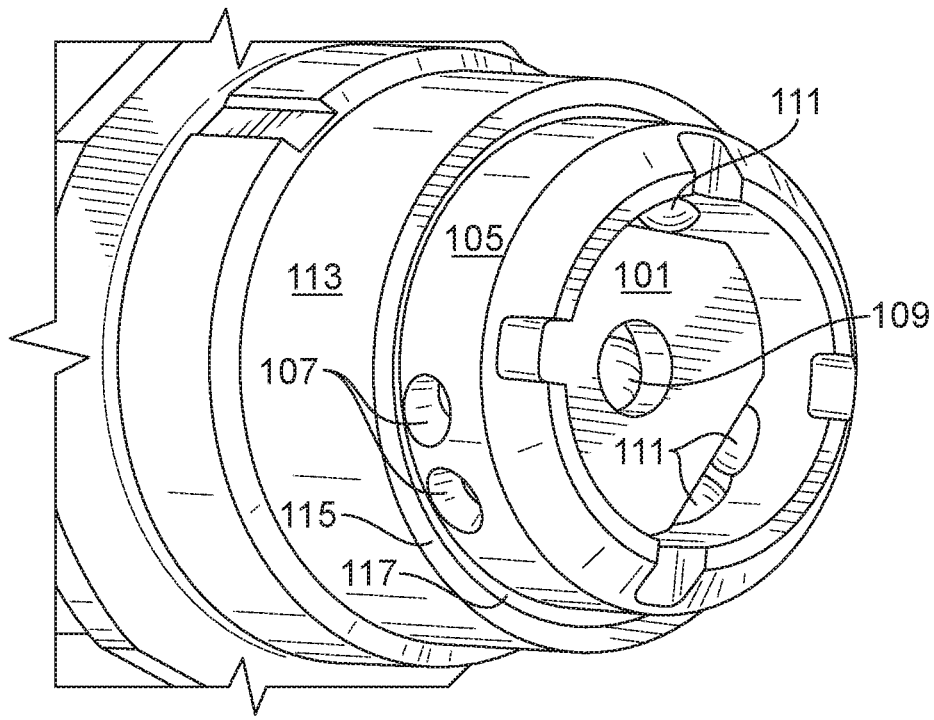
FIG. 6 is a perspective view of the embodiment of FIG. 1, shown in the unlocked position.
Figure 7:
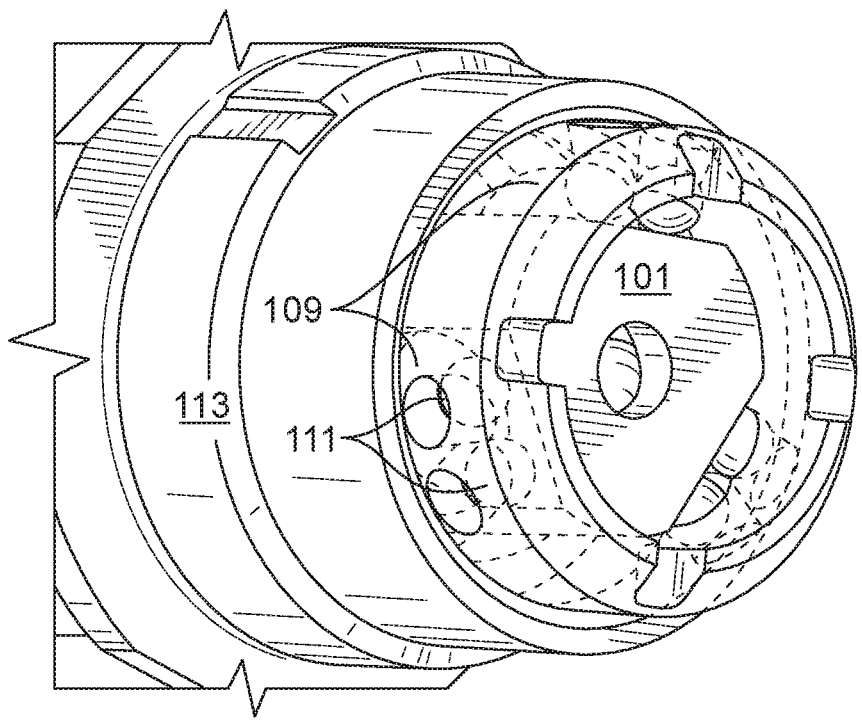
FIG. 7 is a perspective view of the embodiment of FIG. 1, shown having the inner member in phantom and shown in the unlocked position.
Figure 8:
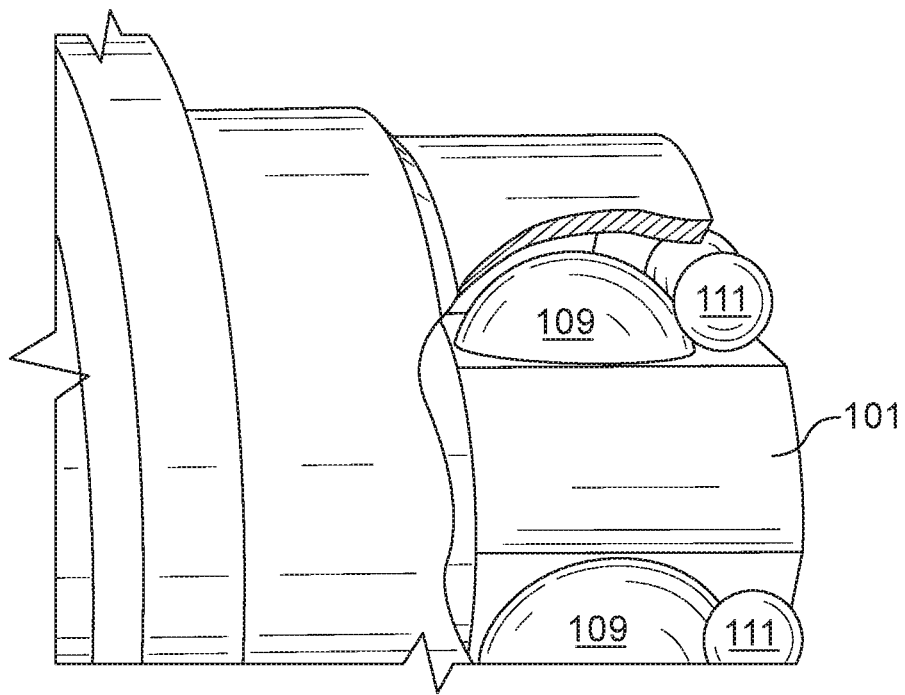
FIG. 8 is a rear perspective view of the embodiment of FIG. 1, shown having the inner member in phantom and shown in the unlocked position.

The mechanism 100 includes one or more locking pawls 111 disposed in each locking pawl opening 107 and configured to move radially relative to the inner member 105 between an extended position (e.g., as shown in FIGS. 1-5) where the locking pawls 111 at least partially protrude from an outer surface 105a of the inner member 105 and a retracted position (e.g., as shown in FIGS. 6-8) where the locking pawls 111 do not extend from the outer surface 105a of the inner member 105. The locking pawls 111 are shaped such that axial movement (e.g., rolling movement left to right) of the pawl rollers 109 causes radial movement of the locking pawls when the pawl rollers contact the locking pawls. At least one of the locking pawls 111 or the pawl rollers 109 are spherical.

The lock bolt 101 is configured to slidably move relative to the inner member 105 between a locked position (e.g., as shown in FIGS. 1-5) where the pawl rollers 109 contact the locking pawls 111 to push the locking pawls 111 to the extended position, and an unlocked position (e.g., as shown in FIGS. 6-8) where the locking pawls 111 are in the retracted position. The lock bolt 101 can be attached to any suitable lock bolt actuator and/or actuated in any suitable manner (via a controllable spring energized actuator).

An outer member 113 is disposed around the inner member 105 and is configured to slidably move relative to the inner member 105. The outer member 113 is prevented from sliding past the locking pawls 111 in the locked position and is allowed to slide past the locking pawls 111 in the unlocked position.

In certain embodiments, each of the pawl rollers 109 and each of the locking pawls 111 can be spherical as shown in FIGS. 1-8. In certain embodiments, the locking pawls 111 can be smaller than the pawl rollers 109. A ratio of size between the pawl rollers 109 and the locking pawls 111 can be selected to provide a predetermined rate of extension of the locking pawls 111 as a function of axial movement of the pawl rollers 109.

It is contemplated that any suitable number of pawl rollers 109 or locking pawls 111 can be spherical or any suitable combination of shapes. Similarly, the locking pawl openings 107 and the pawl roller openings 103 can have a cylindrical shape or any other suitable shape configured to receive the locking pawls 111/pawl rollers 109.

As shown, in certain embodiments, there are two locking pawls 111 for each pawl roller 109. However, any suitable number of locking pawls 111 per pawl roller 109 can be utilized (e.g., one locking pawl 111 per pawl roller 109). In certain embodiments, having a single pawl roller 109 aligned between two locking pawls 111 as shown can cause the lock bolt 101 to be rotationally registered within the inner member 105, e.g., such that the lock bolt 101 does not rotate about the axial axis within the inner member 105. Any other suitable anti-rotation method/system can be implemented if desired (e.g., a ball spline system).

Also, any suitable number of pawl rollers 109 and locking pawls 111 can be utilized. Generally, the more locking pawls 111 of a certain size that are utilized, the larger the force load that can be handled.

In certain embodiments, the pawl rollers 109 can extend through the pawl roller openings 103 (e.g., from an outer surface 101a of the lock bolt 101) and contact each other at a radially inward portion of the lock bolt 101 (which provides radially inward support for each pawl roller 109 and can still allow the pawl rollers 109 to roll within the inner member 105). Any suitable number of pawl rollers 109 (e.g., three or more) can be utilized. Having the pawl rollers 109 contact allows load sharing between the pawl rollers 109.

The outer member 113 can include a locking pawl contact face 115 with a tapered edge 117. The tapered edge 117 can be conformal to the locking pawls 111 or any other suitable shape (e.g., a linear ramp shape). The outer member 113 can be biased (e.g., via a spring of a RAT actuator) against the locking pawls 111 and thereby provide a radially inward retaining force through the tapered edge 113. In this regard, when assembled, the locking pawls 111 can be prevented from sliding out of the locking pawl openings 107. In embodiments where the locking pawls 111 and the pawl rollers 109 are always in contact, whether in the retracted position or otherwise, the locking pawls 111 can push against the pawl rollers 109 to compress the pawl rollers 109 into contact regardless of the direction of gravity. However, it is contemplated that the pawl rollers 109 and/or the locking pawls can be retained in any other suitable manner.

Stowing and locking of a RAT actuator can be done with application of hydraulic pressure to retract the deployed actuator (e.g., which can include the outer member 113). Once the actuator is retracted such that contact face 115 of the outer member 113 is behind the locking pawls 111, the lock bolt 101 can be shuttled hydraulically from the unlocked position (e.g., FIGS. 6-8) to the locked position (e.g., FIGS. 1-5), thereby allowing the pawl rollers 109 to engage the lock pawls 111. As the retraction progresses toward the locked position, the lock bolt 101 and the pawl rollers 109 raise the lock pawls 111 into the extended position, mechanically blocking the extension of the actuator (associated with the outer member 113). The actuator remains in this locked state after the application of hydraulic pressure is discontinued. Deployment (release) can occur when the actuator's deployment mechanism (not shown) receives a deployment command which allows the lock bolt 101 (which can be spring energized) to translate left toward the unlocked position, thereby removing radial support from underneath the lock pawls 111 which allows the lock pawls 111 to radially retract inward to the retracted position, thereby removing the mechanical blockage resulting in the extension of the spring loaded actuator.

In accordance with at least one aspect of this disclosure, embodiments of a ram air turbine actuator locking mechanism, e.g., as described above can include a first member including a plurality of pawl roller openings, a second member being axially movable relative to the first member at least between a locked position and an unlocked position, the second member including a plurality of locking pawl openings, and one or more pawl rollers disposed in each pawl roller opening such that the pawl rollers at least partially extend radially outward from a first outer surface of the first member. One or more locking pawls can be disposed in each locking pawl opening and configured to move radially relative to the second member between an extended position where the locking pawls at least partially extend radially outward of a second outer surface of the second member and a retracted position where the locking pawls do not extend radially outward of the second outer surface. As appreciated by those having ordinary skill in the art, the extended position coexisting with the locked position and the retracted position coexisting with the unlocked position. The pawl rollers, the locking pawls, the first member, and the second member can be shaped and configured such that axial movement in a first direction of the first member relative to the second member causes the pawl rollers to contact the locking pawls and to urge them radially outward toward the extended position thereby defining the locked position, at least one of the locking pawls or the pawl rollers being spherical. The mechanism can include a third member in operable communication with the second member, the third member being prevented from moving past the locking pawls in the locked position and being allowed to move past the locking pawls in the unlocked position.

Incorporation of spherical locking pawls and/or spherical pawl rollers offers a significant cost saving advantage by simplifying the geometry of the pawls and rollers, which in turn, reduces the manufacturing complexity of the pawl and pawl roller pockets. Spherical pawls and rollers allow the windows to be manufactured more efficiently (e.g., by a simple drilling operation followed by a traditional rotary honing to achieve the desired surface finish). Also, such shapes allows use of off-the-shelf rollers.

The methods and systems of the present disclosure, as described above and shown in the drawings, provide for RAT actuator locking mechanisms with superior properties. While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. A ram air turbine actuator locking mechanism, comprising:
   a first member including a plurality of pawl roller openings;
   a second member being axially movable relative to the first member at least between a locked position and an unlocked position, the second member including a plurality of locking pawl openings;
   one or more pawl rollers disposed in each pawl roller opening such that the pawl rollers at least partially extend radially outward from a first outer surface of the first member;
   one or more locking pawls disposed in each locking pawl opening and configured to move radially relative to the second member between an extended position where the locking pawls at least partially extend radially outward of a second outer surface of the second member and a retracted position where the locking pawls do not extend radially outward of the second outer surface, the extended position coexisting with the locked position and the retracted position coexisting with the unlocked position,
   wherein the pawl rollers, the locking pawls, the first member and the second member are shaped and configured such that axial movement in a first direction of the first member relative to the second member causes the pawl rollers to contact the locking pawls and to urge them radially outward toward the extended position thereby defining the locked position, at least one of the locking pawls or the pawl rollers being spherical; and
   a third member in operable communication with the second member, the third member being prevented from moving past the locking pawls in the locked position and being allowed to move past the locking pawls in the unlocked position, wherein each of the pawl rollers and each of the locking pawls are spherical, wherein pawl rollers extend through the pawl roller openings and contact each other at a radially inward portion of the first member.

2. The locking mechanism of claim 1, wherein the locking pawls are smaller than the pawl rollers.

3. The locking mechanism of claim 1, wherein there are two locking pawls for each pawl roller.

4. The locking mechanism of claim 1, wherein the locking pawl openings and the pawl roller openings have a cylindrical shape.

5. The locking mechanism of claim 1, wherein a ratio of size between the pawl rollers and the locking pawls is selected to provide a predetermined rate of extension of the locking pawls as a function of axial movement of the pawl rollers.

6. The locking mechanism of claim 1, wherein the third member can include a locking pawl contact face with a tapered edge.

7. The locking mechanism of claim 6, wherein the tapered edge is conformal to the locking pawls.

8. The locking mechanism of claim 6, wherein the third member is biased against the locking pawls and thereby provides a radially inward retaining force through the tapered edge.

* * * * *